US012256189B2

(12) United States Patent
Klingberg et al.

(10) Patent No.: US 12,256,189 B2
(45) Date of Patent: Mar. 18, 2025

(54) LOUDSPEAKER ARRANGEMENT

(71) Applicant: Harman International Industries, Incorporated, Stamford, CT (US)

(72) Inventors: Hans Olof Klingberg, Västra Frölunda (SE); Hans-Juergen Regl, Bogen (DE)

(73) Assignee: Harman International Industries, Incorporated, Stamford, CT (US)

( * ) Notice: Subject to any disclaimer, the term of this patent is extended or adjusted under 35 U.S.C. 154(b) by 248 days.

(21) Appl. No.: 18/097,864

(22) Filed: Jan. 17, 2023

(65) Prior Publication Data

US 2023/0247346 A1 Aug. 3, 2023

(30) Foreign Application Priority Data

Jan. 31, 2022 (EP) .................................... 22154208

(51) Int. Cl.

| | |
|---|---|
| ***H04R 1/28*** | (2006.01) |
| ***B60Q 5/00*** | (2006.01) |
| ***B60R 11/02*** | (2006.01) |
| ***G10K 11/30*** | (2006.01) |
| ***H04R 1/02*** | (2006.01) |
| ***H04R 1/30*** | (2006.01) |
| ***H04R 3/00*** | (2006.01) |
| ***H04R 7/12*** | (2006.01) |
| *B60R 11/00* | (2006.01) |

(52) U.S. Cl.

CPC ............. *H04R 1/2842* (2013.01); *B60Q 5/00* (2013.01); *B60R 11/0217* (2013.01); *G10K 11/30* (2013.01); *H04R 1/025* (2013.01); *H04R 1/30* (2013.01); *H04R 3/00* (2013.01); *H04R 7/12* (2013.01); *B60R 2011/004* (2013.01); *H04R 2499/13* (2013.01)

(58) Field of Classification Search

None

See application file for complete search history.

(56) References Cited

U.S. PATENT DOCUMENTS 5,637,840 A 6/1997 Kim
8,615,100 B2 * 12/2013 Tsuruta .................... G10K 9/22 181/149
2012/0235802 A1 * 9/2012 Nakayama ............. G10K 15/02 340/425.5

FOREIGN PATENT DOCUMENTS

EP 3407617 A1 11/2018
WO 2020249660 A1 12/2020

* cited by examiner

*Primary Examiner* — Paul W Huber
(74) *Attorney, Agent, or Firm* — Angela M. Brunetti

(57) ABSTRACT

A loudspeaker arrangement comprises a transducer arranged in a loudspeaker enclosure, the loudspeaker enclosure enclosing a rear part of the transducer, and an aperture-defining structure (hereinafter, the aperture) mounted on a front side of the transducer in a direction of propagation of sound emitted by the transducer. The transducer is configured to emit sound within a wide frequency range, and at frequencies of above a predetermined threshold. The aperture is configured to amplify sound at predetermined frequencies or within a predetermined frequency range within the wide frequency range, and to let sound at all other frequencies within the wide frequency range pass essentially unaltered. The loudspeaker enclosure is sized such that the resonance frequency of the loudspeaker enclosure matches the resonance frequency of the transducer in free air, wherein the resonance frequency of the transducer in free air is below the predetermined threshold.

15 Claims, 2 Drawing Sheets

100
16
14
18
20
12
10

LOUDSPEAKER ARRANGEMENT

CROSS REFERENCE

Priority is claimed to application serial no. 22154208.7, filed Jan. 31, 2022 in Europe, the disclosure of which is incorporated in its entirety by reference.

TECHNICAL FIELD

The disclosure relates to a loudspeaker arrangement, in particular to a loudspeaker arrangement for a vehicle that is suitable to fulfill different functions.

BACKGROUND

Vehicles generally comprise a plurality of loudspeakers for a plurality of different functions and applications. For example, each vehicle today is required to comprise a signal horn that generates sounds at comparably high frequencies. Some vehicles such as electric vehicles, for example, further comprise loudspeakers which output synthesized engine sounds that resemble the sound of conventional combustion engines, in order to alert pedestrians or other road users of the presence of the vehicle, as the electric vehicle itself generates essentially no sounds at all. Many additional loudspeakers are present in a vehicle for use in even further applications. Each of the different loudspeakers, however, requires a certain amount of space and components. There is a need for a loudspeaker that reduces the space and cost requirements within a vehicle.

SUMMARY

A loudspeaker arrangement includes a transducer arranged in a loudspeaker enclosure, the loudspeaker enclosure enclosing a rear part of the transducer, and an aperture-defining structure defining an aperture and hereinafter referred to as "aperture". The aperture is mounted on a front side of the transducer in a direction of propagation of sound emitted by the transducer, wherein the transducer is configured to emit sound within a wide frequency range, and at frequencies of above a predetermined threshold, the aperture is configured to amplify sound at predetermined frequencies or within a predetermined frequency range within the wide frequency range, and to let sound at all other frequencies within the wide frequency range pass essentially unaltered, and the loudspeaker enclosure is sized such that the resonance frequency of the loudspeaker enclosure matches the resonance frequency of the transducer in free air, wherein the resonance frequency of the transducer in free air is below the predetermined threshold.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The method may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

Vehicles include components that generate noise that is typically audible to a driver, any passengers within the passenger compartment, as well as to road users in the surroundings of the vehicle. For example, a driver and other road users may hear noise generated by an engine of a powertrain, and an exhaust system of the vehicle. Such noise may be reduced or even completely absent in new vehicle architectures and driving modes. For example, an electric vehicle does not include an internal combustion engine, and therefore does not generate typical engine noise. The absence of engine noise may be unexpected for a driver, and may be hazardous for other road users who, for example, may want to cross a road and might not become aware of an approaching vehicle. Therefore, a vehicle audio system may generate synthetic noise that represents typical or expected noise generated while operating the vehicle. Such a vehicle audio system comprises one or more loudspeakers and is often referred to as acoustic vehicle alerting system AVAS.

Vehicles further include several further systems and applications requiring additional loudspeakers. For example, every vehicle today is required to comprise a signal horn. The sound emitted by a signal horn usually resembles a "honk" or "beep". The signal horn may be used by a driver to warn other road users of a vehicle's approach or presence, or call attention to any kind of hazard. Signal horns are often implemented as single frequency resonators.

In the following, loudspeaker arrangements 100 are described which combine the functionality of a signal horn with the functionality of an AVAS system. In this way, only a single loudspeaker arrangement is needed for two different applications which reduces the complexity, space requirements, and costs for car manufacturers.

Figure 1:
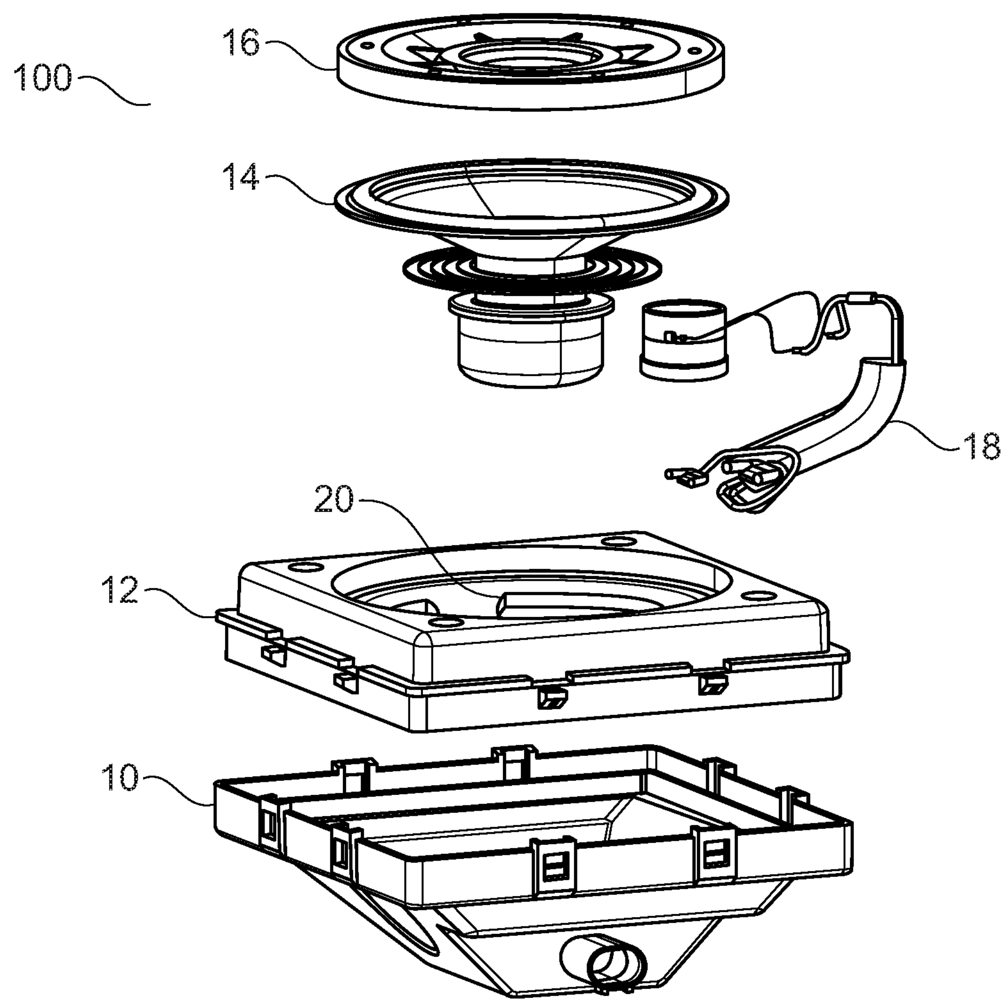
FIG. 1 schematically illustrates an exploded view of a loudspeaker arrangement according to one example.

FIG. 1 schematically illustrates a loudspeaker arrangement 100 according to one example. The loudspeaker arrangement 100 comprises a transducer 14. In a transducer 14, energy of one form is converted to energy of a different form. Electroacoustic transducers convert electrical impulses to acoustic vibrations that may be perceived as audible sound to proximate listeners. The transducer 14 is mounted in a loudspeaker enclosure, the loudspeaker enclosure comprising a rear enclosure part 10, and a front enclosure part 12. According to another example, however, the loudspeaker enclosure may be formed of a single part or by three or even more parts. The loudspeaker enclosure (e.g., the front enclosure part 12) comprises an opening 20 in which the transducer 14 may be mounted. The rear enclosure part 10 is mounted to the front enclosure part 12, thereby forming a closed enclosure. The loudspeaker enclosure 10, 12 encloses a rear part of the transducer 14, while a front part of the transducer 14 faces the outside of the loudspeaker enclosure 10, 12. An aperture-defining structure 16, hereinafter referred to as "the aperture", is mounted on a front side of the transducer 14 in a direction of propagation of sound emitted by the transducer 14. The aperture 16 may either be mounted to the front enclosure part 12 or to the transducer 14, or both. The aperture 16 is configured to hover just above the moving surface (diaphragm) of the transducer 14 (e.g., to be positioned in front of an opening of the transducer 14) to block specific areas of the diaphragm from direct radiation (e.g., output). The aperture 16 includes a solid, at least semi rigid structure that may be composed of a material that is selected based on the acoustical properties of the transducer 14.

The transducer 14 is configured to emit sound over a wide frequency range. According to one example, when the transducer 14 emits sound at predetermined frequencies or within a predetermined frequency range within the overall wide frequency range of the transducer 14, the loudspeaker arrangement 100 functions as a signal horn, and, when the transducer 14 emits sound at other frequencies than the predetermined frequencies or at frequencies outside of the predetermined frequency range within the wide frequency range, the loudspeaker arrangement 100 functions as an acoustic vehicle alerting system AVAS, generating synthesized engine noise SEN. According to one example, the transducer 14 may be configured to emit sound over a frequency range of between 800 Hz and 2500 Hz. Other frequency ranges, however, are also possible. When the loudspeaker arrangement 100 functions as a signal horn, sound may be emitted by the transducer 14 at comparably high frequencies such as, e.g., about 1600 Hz or more, or even 2000 Hz or more. The predetermined frequencies or the predetermined frequency range that are used for the signal horn functionality, therefore, may be above a predetermined threshold frequency of between 1600 Hz and 2000 Hz, for example. Only a single frequency (e.g. 1800 Hz) or a comparably small frequency range (e.g., between 1800 Hz and 2000 Hz) may be used for the signal horn functionality, as the signal horn generally uses a single tone or only a few tones. The synthesized engine noise SEN may be generated at frequencies below the predetermined frequencies or below the predetermined frequency band. It is, however, also possible that frequencies that are higher than the predetermined frequencies or higher than the predetermined frequency band are used for the SEN functionality as well. Usually a broader frequency range is used for the AVAS functionality as compared to the signal horn functionality.

Generally speaking, the loudspeaker arrangement 100 has two different operation modes. In a first operation mode, the loudspeaker arrangement 100 functions as a signal horn, emitting sound over a limited first bandwidth (frequency range) at very high sound pressure levels (due to the amplification by the aperture 16 at the desired frequencies). In a second operation mode, the loudspeaker arrangement 100 functions as an AVAS system, emitting sound over a relatively wide second frequency range at a required sound pressure level. The sound pressure levels achieved in the first operation mode may be significantly higher than the sound pressure levels achieved in the second operation mode. For example, the sound pressure levels in the first operation mode may be at least 3 dB, at least 5 dB, or at least 7 dB higher than the sound pressure levels achieved in the second operation mode. The signal horn functionality of the loudspeaker arrangement 100 may also include other alarm or warning signals that may be generated in a vehicle such as, e.g., antitheft alarms, emergency vehicle sirens, etc.

The loudspeaker enclosure 10, 12, when fully mounted (see, e.g., FIG. 2) may be comparably small. In particular, the loudspeaker enclosure 10, 12 may be sized such that the resonance frequency of the loudspeaker enclosure 10, 12 matches the resonance frequency of the transducer 14 in free air, wherein the resonance frequency of the transducer 14 in free air is below the predetermined threshold. In this way, when sound is emitted at the resonance frequency, a sound pressure level will be achieved which is considered sufficient for the AVAS functionality. That is, the sound may be clearly perceived by other road users, and by any passengers of the vehicle. For example, the sound pressure level, when sound is emitted at the resonance frequency of the transducer 14, may be 90 dB or higher.

Typical frequencies for the AVAS functionality are about 1800 Hz or lower, or 1600 Hz, or lower. A loudspeaker enclosure 10, 12, therefore, may have a length 11 of between 100 mm and 200 mm, a width w1 of between 100 mm and 200 mm, and a height h1 of between 30 mm and 90 mm (see, e.g., FIG. 2). The exact dimensions may depend on the actual resonance frequency of the transducer 14. In this way, the resonance frequency of the loudspeaker enclosure 10, 12 matches the resonance frequency of the transducer 14 in free air, if the resonance frequency of the transducer 14 is between 1000 Hz and 1800 Hz, for example. Other resonance frequencies and corresponding dimensions of the loudspeaker enclosure 10, 12, however, are also possible.

Sound that is emitted at the desired frequencies or within the desired frequency range at comparably high frequencies, however, may have insufficient sound pressure levels and, therefore, may be unsuitable for the signal horn functionality. Therefore, an aperture 16 is mounted in front of the transducer 14, wherein the aperture 16 is configured to amplify sound at frequencies above the predetermined threshold. For example, sound at the desired frequencies or within the desired frequency range may be amplified such that sound pressure levels of 100 dB or more are reached for the desired frequencies or within the desired frequency range. The aperture 16 may be configured to amplify sound only at specific frequencies or within specified frequency bands. When functioning as a signal horn, the transducer 14 may emit sound at these specific frequencies or within the specific frequency ranges such that these frequencies are amplified to reach the desired sound pressure levels for the signal horn functionality. The aperture 16, however, lets sound at all other frequencies pass essentially unaltered. Such sound already achieves the desired sound pressure levels for the AVAS functionality due to the size of the loudspeaker enclosure 10, 12. The aperture 16, therefore, does not impact the AVAS functionality of the loudspeaker arrangement 100 in any way.

The loudspeaker arrangement 100 may further comprise respective cabling or wiring 18. The cabling or wiring 18 may be conventional cabling or wiring 18 as is known from conventional loudspeaker arrangements.

Figure 2:
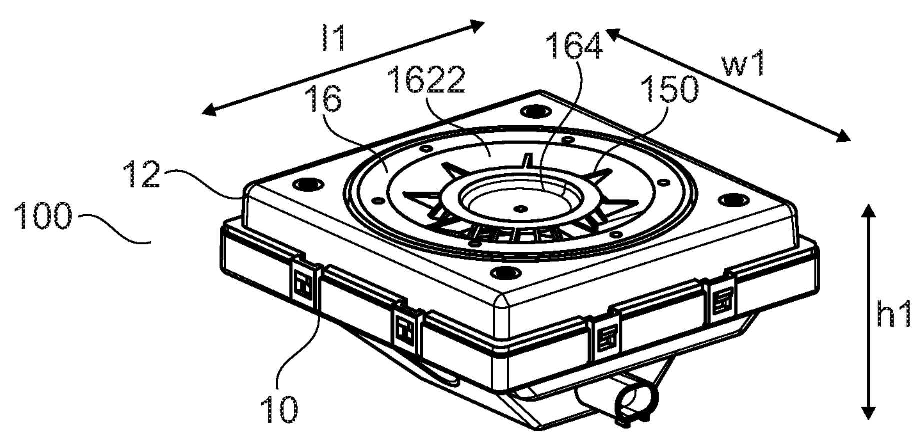
FIG. 2 schematically illustrates a three-dimensional view of a loudspeaker arrangement according to one example.

In the figures, FIG. 1 schematically illustrates an exploded view of an exemplary loudspeaker arrangement 100, while FIG. 2 schematically illustrates the loudspeaker arrangement 100 of FIG. 1 in a mounted state.

Figure 3:
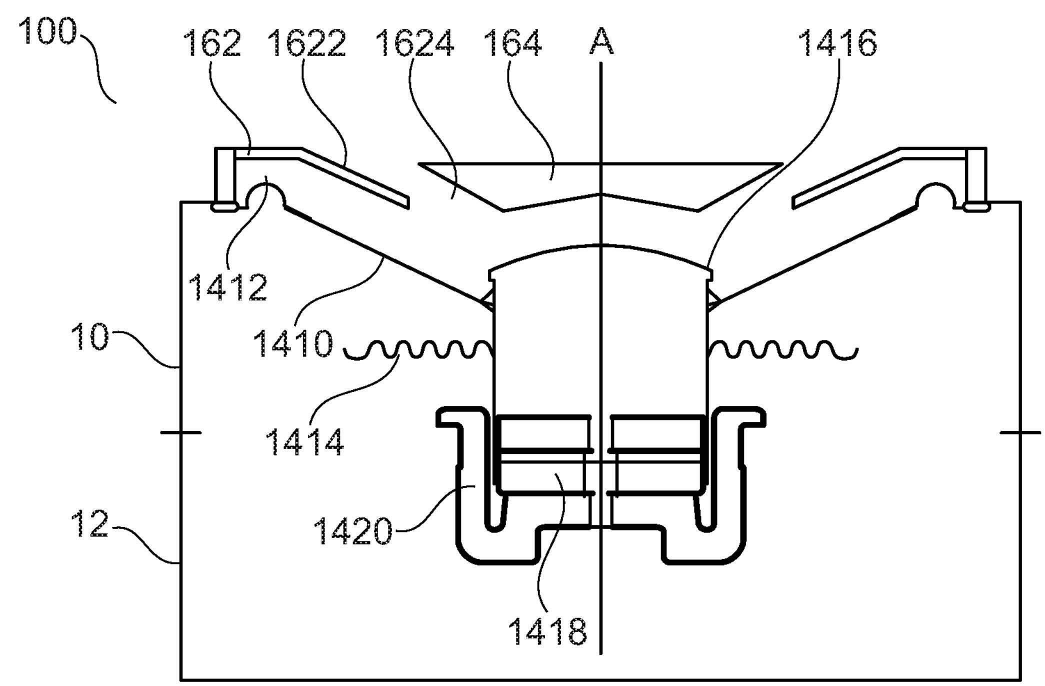
FIG. 3 schematically illustrates a cross-sectional view of a loudspeaker arrangement according to one example.

Now referring to FIG. 3, the transducer may include a conical diaphragm 1410 that frames with the magnetic sound-producing components mounted to the small end of the cone. The large end of the conical diaphragm 1410 may be coupled to the loudspeaker enclosure 10, 12 by means of a surround 1412. The magnetic sound-producing components comprise, e.g., a magnet 1418, a pole piece 1420, and a voice coil (not specifically illustrated in FIG. 3). The transducer further comprises a dust cap 1416 and a spider 1414.

In particular, the transducer 14 may comprise a conical diaphragm 1410 that is positioned adjacent to a front surface of the loudspeaker enclosure 10, 12 (within an opening 20 in the front surface of the loudspeaker enclosure 10, 12). The diaphragm 1410 may be a thin, lightweight piece that is usually made of plastic (paper, or metal, for example, may also be suitable materials) while the loudspeaker enclosure 10, 12 (or a frame of the diaphragm 1410 that couples to the loudspeaker enclosure 10, 12) may be rigid and made of thicker plastic or metal relative to the diaphragm 1410 in order to provide a support structure for the diaphragm 1410 and other speaker components. The diaphragm 1410 may be supported by a suspension system to allow the diaphragm to move in an axial direction (e.g., along a central axis of the conical diaphragm 1410) while remaining flexibly connected to the loudspeaker enclosure 10, 12. The suspension system may include a rim of flexible material (surround 1412) that attaches the diaphragm 1410 to the loudspeaker enclosure 10, 12 near the larger end of the transducer 14, and corrugated material that is attached to the loudspeaker enclosure 10, 12 and a voice coil (not specifically illustrated) located near the center of the diaphragm 1410. When an electric current from an external source such as an amplifier is passed through the voice coil, an electromagnet is formed that interacts with the permanent magnet 1418 of the transducer 14. The amplifier, or external source, rapidly reverses the electrical signal causing the polarity of the voice coil to rapidly reverse. The rapid reversal of polarity in turn causes the electromagnet and permanent magnet 1418 to interact, thereby forcing the voice coil and attached diaphragm 1410 to move back and forth along the axial direction (e.g., a direction of radiation) of the transducer 14. The movement of the diaphragm 1410 vibrates the air in front of and behind the transducer 14, thereby creating propagating sound waves. Accordingly, the conical diaphragm 1410 forms a radiating surface of the transducer 14.

The aperture 16 may comprise a conical horn 162, and an acoustic lens 164. The size and shape of the conical horn 162 and the acoustic lens 164 as well as their respective positions with regard to each other may be chosen in order to amplify sound at desired frequencies or within a desired frequency range to desired sound pressure levels, and to let sound at all other frequencies pass essentially unaltered.

The aperture 16 is a three-dimensional feature with a varying depth relative to a front surface (e.g., the illustrated front surface in FIG. 2) of the loudspeaker enclosure 10, 12. In particular, the conical horn 162 may curve inward toward an interior of the loudspeaker enclosure 10, 12 corresponding to a slope of a radiating surface of the transducer 14 (which slopes inward toward the interior of the enclosure 10, 12 in a uniform manner from the circumferential edge (surround 1412) to a center of the transducer 14). Accordingly, the shape of the conical horn 162 in a direction from the circumferential edge (surround 1412) toward the center of the transducer 14 (e.g., a smallest end of a diaphragm 1410 of the transducer) slopes inward to have an increasing depth relative to the front surface of the enclosure 10, 12 (e.g., portions of the conical horn 162 that are closer to the center of the transducer 14 extend more toward the interior of the enclosure than portions of the conical horn 162 that are closer to the circumferential edge of the transducer 14). The slope of the conical horn 162 may correspond to that of the transducer 14 such that the conical horn 162 maintains a separation from the transducer 14 (e.g., the portion of the transducer 14 located directly below the conical horn 162) within a range of 1 to 2 mm (or some other separation range that accounts for the maximum extension/movement of the transducer 14 to ensure that the transducer 14, e.g., the diaphragm 1410, does not contact the conical horn 162 during operation).

According to the examples illustrated in FIGS. 1 to 3, the conical horn 162 is formed by a sloped portion 1622 of the aperture 16, the sloped portion 1622 covering only a portion of a radiating surface of the diaphragm 1410 and having a shape that corresponds to the contours of the diaphragm 1410. As is illustrated in the cross-sectional view of FIG. 3, the sloped portion 1622 maintains a uniform spacing between the radiating surface of the diaphragm 1410 and a diaphragm-facing surface of the sloped portion 1622, as the sloped portion 1622 extends from a circumferential edge of the diaphragm 1410 toward a center of the diaphragm 1410. The circumferential edge of the diaphragm 1410 is an edge that is coupled to the loudspeaker enclosure 10, 12 via the surround 1412. The conical horn 162 may cover one fourth to two thirds of the radiating surface of the diaphragm 1410, for example, in order to achieve the desired effect. A central portion of the diaphragm 1410, however, is not covered by the conical horn 162. The size of the area of the sound radiating surface of the diaphragm 1410 that is covered by the conical horn 162 may depend on the frequencies that are to be amplified by the aperture 16, for example. The size of the area of the sound radiating surface of the diaphragm 1410 that is covered by the conical horn 162 may depend on other factors as well such as, e.g., the overall size of the sound radiating surface of the diaphragm 1410.

As has been previously described, the conical horn 162 comprises an opening 1624 above a central part of the diaphragm 1410 such that the central part of the diaphragm 1410 is not covered by the conical horn 162. The acoustic lens 164 may be arranged vertically above the opening 1624 formed by the conical horn 162 such that the opening 1624 is arranged between the acoustic lens 164 and the diaphragm 1410. The acoustic lens 164 may be coupled to the conical horn 162 by means of a plurality of vertical bars 150, which is exemplarily illustrated in FIG. 2. Such narrow vertical bars 150 which generally extend in a vertical direction (e.g., direction of sound propagation) between the conical horn 162 and the acoustic lens 164, do not significantly alter the sound emitted by the transducer 14. The bars 150 may be arranged periodically around a circumference of the conical horn 162 and the acoustic lens 164. The acoustic lens 164 does not directly adjoin the conical horn 162 such that a gap remains between the two components to allow sound emitted by the transducer 14 to propagate.

The acoustic lens 164 may generally have the form of a disc or plate, for example. The acoustic lens 164 may have a round cross-section, as is schematically illustrated in FIGS. 1 and 2. The acoustic lens 164, however, may have any other suitable cross-sections in order to achieve the desired effect of amplifying sound that desired frequencies or within a desired frequency range.

The aperture 16 described with respect to FIGS. 1 to 3 above is only one example. The aperture 16 may generally be dimensioned and shaped in many different ways in order to amplify sound at desired frequencies or within desired frequency ranges, and to let sound at all other frequencies pass essentially unaltered. According to one example, the aperture 14 is rotationally symmetric around a central axis A, wherein the central axis A is a vertical axis (see, e.g., FIG. 3).

Figure 4:
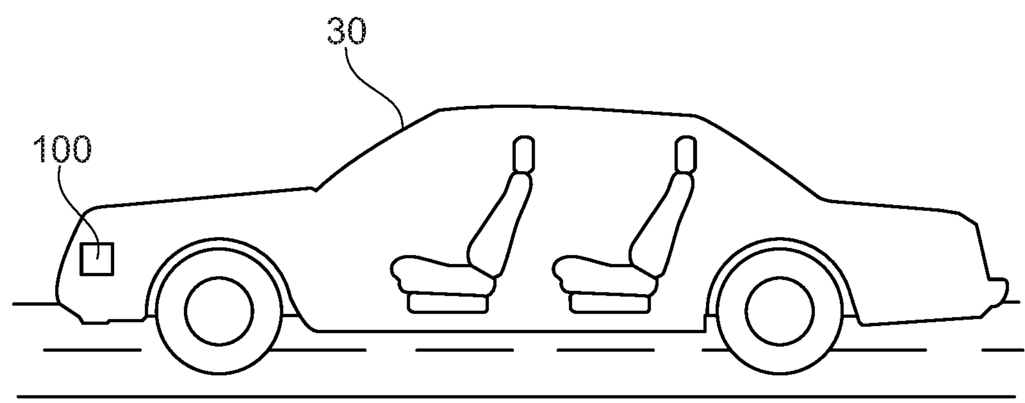
FIG. 4 schematically illustrates a vehicle comprising a loudspeaker arrangement according to one example.

Now referring to FIG. 4, the loudspeaker arrangement 100 may be arranged in a vehicle 30. According to one example, the loudspeaker arrangement 100 may be arranged in a front part of the vehicle 30, e.g., behind a front bumper. In this way, when the loudspeaker arrangement 100 functions as a vehicle horn, the sound emitted by the loudspeaker arrangement 100 is clearly audible to other road users. The same applies when the loudspeaker arrangement 100 functions as an acoustic vehicle alerting system AVAS. When the loudspeaker arrangement 100 is arranged in a frontal position of the vehicle 30, the generated synthesized engine noise SEN is clearly audible to other road users. As the loudspeaker enclosure 10, 12 has a comparably small size in order to match the resonance frequency of the transducer 14 in free air, it may be easily fitted in a position behind the front bumper of a vehicle 30, for example. Other positions within the vehicle 30, however, are also possible which provide sufficient space and ensure sufficient audibility of the emitted sounds to other road users.

The loudspeaker arrangement 100 may be arranged in an exposed position of the vehicle 30. Exposed in this context means that it may be exposed to all kinds of environmental conditions such as, e.g., dirt, rain, spray water, humidity, etc. The transducer 14, however, is well protected from such environmental conditions by means of the aperture 16 that is mounted in front of the transducer 14. That is, the aperture 16, in addition to its amplifying function, further has a protecting function, as it prevents water, dirt or any objects that may damage the transducer 14, for example, from reaching the transducer 14, in particular the diaphragm 1410, or even the electronic parts of the transducer 14. Even if the transducer cannot be entirely protected, the aperture 16 at least significantly reduces the degree of exposure of the transducer 14.

It may be understood that the illustrated methods and systems are merely examples. While various embodiments of the invention have been described, it will be apparent to those of ordinary skill in the art that many more embodiments and implementations are possible within the scope of the invention. In particular, the skilled person will recognize the interchangeability of various features from different embodiments. Although these techniques and systems have been disclosed in the context of certain embodiments and examples, it will be understood that these techniques and systems may be extended beyond the specifically disclosed embodiments to other embodiments and/or uses and obvious modifications thereof. Accordingly, the invention is not to be restricted except in light of the attached claims and their equivalents.

The description of embodiments has been presented for purposes of illustration and description. Suitable modifications and variations to the embodiments may be performed in light of the above description or may be acquired from practicing the methods. The described arrangements are exemplary in nature, and may include additional elements and/or omit elements. As used in this application, an element recited in the singular and proceeded with the word "a" or "an" should be understood as not excluding plural of said elements, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The described systems are exemplary in nature, and may include additional elements and/or omit elements. The subject matter of the present disclosure includes all novel and non-obvious combinations and sub-combinations of the various systems and configurations, and other features, functions, and/or properties disclosed. The following claims particularly point out subject matter from the above disclosure that is regarded as novel and non-obvious.

What is claimed is:

1. A loudspeaker arrangement, comprising:

a transducer arranged in a loudspeaker enclosure, the loudspeaker enclosure encloses a rear part of the transducer;

an aperture-defining structure defines an aperture, the aperture-defining structure is mounted on a front side of the transducer in a direction of propagation of sound emitted by the transducer;

the transducer is configured to emit sound at frequencies within a predetermined wide frequency range;

the aperture defined by the aperture defining structure is configured to amplify sound at predetermined frequencies or within a predetermined frequency range within the predetermined wide frequency range, and to let sound at all other frequencies within the predetermined wide frequency range pass essentially unaltered; and the loudspeaker enclosure is sized such that a resonance frequency of the loudspeaker enclosure matches a resonance frequency of the transducer in free air, the resonance frequency of the transducer in free air is below a predetermined threshold.

2. The loudspeaker arrangement of claim 1, further comprising a first operation mode, in the first operation mode, when the transducer emits sound at the predetermined frequencies or within the predetermined frequency range, the loudspeaker arrangement functions as a signal horn emitting sound over a limited first frequency range at first sound pressure levels.

3. The loudspeaker arrangement of claim 2, further comprising a second operation mode, in the second operation mode, when the transducer emits sound at frequencies other than the predetermined frequencies or at frequencies outside the predetermined frequency range, it functions as an acoustic vehicle alerting system AVAS, generating synthesized engine noise SEN over a second frequency range that is broader than the first frequency range at second sound pressure levels.

4. The loudspeaker arrangement of claim 3, wherein the first sound pressure levels at which sound is output in the first operation mode are at least one of 3 dB, 5 dB, or 7 dB higher than the second sound pressure levels at which sound is output in the second operation mode.

5. The loudspeaker arrangement of claim 1, wherein the loudspeaker enclosure has a length between 100 mm and 200 mm, a width between 100 mm and 200 mm, and a height between 30 mm and 90 mm.

6. The loudspeaker arrangement of claim 1, wherein the predetermined frequencies and predetermined frequency range are above a predetermined threshold frequency range of 1600 Hz and 2000 Hz.

7. The loudspeaker arrangement of claim 1, wherein the transducer further comprises a diaphragm, and the aperture further comprises a conical horn and an acoustic lens.

8. The loudspeaker arrangement of claim 7, wherein the conical horn is formed by a sloped portion of the aperture, the sloped portion covers only a portion of a radiating surface of the diaphragm and has a shape that corresponds to the radiating surface of the diaphragm.

9. The loudspeaker arrangement of claim 8, wherein the sloped portion defines a uniform spacing between the radiating surface of the diaphragm and a diaphragm-facing surface of the sloped portion, as the sloped portion extends from a circumferential edge of the diaphragm toward a center of the diaphragm.

10. The loudspeaker arrangement of claim 7, wherein the conical horn covers one fourth to two thirds of the radiating surface of the diaphragm.

11. The loudspeaker arrangement of claim 7, wherein the conical horn further comprises an opening above a central part of the diaphragm.

12. The loudspeaker arrangement of claim 11, wherein the acoustic lens is arranged vertically above the opening such that the opening is arranged between the acoustic lens and the diaphragm.

13. The loudspeaker arrangement of claim 1, wherein the aperture is further configured to protect the transducer.

14. The loudspeaker arrangement of claim 1, wherein the loudspeaker arrangement is arranged on a vehicle.

15. The loudspeaker arrangement of claim 14, wherein the loudspeaker arrangement is arranged in a front part of the vehicle behind a front bumper.

* * * * *